United States Patent [19]

Romeyke

[11] 4,249,371
[45] Feb. 10, 1981

[54] METHOD AND APPARATUS FOR DISSIPATING HEAT IN GAS TURBINES DURING SHUT-DOWN

[75] Inventor: Norbert Romeyke, Lampertheim, Fed. Rep. of Germany

[73] Assignee: BBC Brown Boveri & Company Limited, Baden, Switzerland

[21] Appl. No.: 918,156

[22] Filed: Jun. 22, 1978

[30] Foreign Application Priority Data

Jun. 24, 1977 [DE] Fed. Rep. of Germany ....... 2728382

[51] Int. Cl.³ .............................................. F02C 6/00
[52] U.S. Cl. .............................. 60/39.04; 60/39.09 R; 60/39.17; 60/39.75; 60/727
[58] Field of Search ............... 415/104, 107, 116, 117, 415/175; 60/39.02, 39.09 R, 39.07, 39.17, 39.23, 39.65, 39.66, 39.75, 39.04

[56] References Cited

U.S. PATENT DOCUMENTS

| | | | |
|---|---|---|---|
| 1,988,456 | 1/1935 | Lysholm | 60/39.17 |
| 3,044,744 | 7/1962 | Berlyn | 415/117 X |
| 3,903,691 | 9/1975 | Szydlowski | 60/39.66 |
| 4,003,200 | 1/1977 | Zerlauth | 60/39.02 |
| 4,041,695 | 8/1977 | Harper et al. | 60/39.02 |

Primary Examiner—John J. Vrablik
Assistant Examiner—Edward Look
Attorney, Agent, or Firm—Burns, Doane, Swecker & Mathis

[57] ABSTRACT

An accumulation of heat which takes place in gas turbines during deceleration of turbine components, such as during shut-down, may be dissipated by flowing a supply of cooling air through the turbine stages. The cooling air is selectively supplied after the supply of combustion air and fuel has been discontinued. The cooling air is preferably flowed through the combustion chambers prior to entry into the turbine stages so that the cooling air is initially pre-heated. Additional air may preferably be supplied to the final ring of blades of each stage or of the final stage of a multi-staged turbine.

11 Claims, 1 Drawing Figure

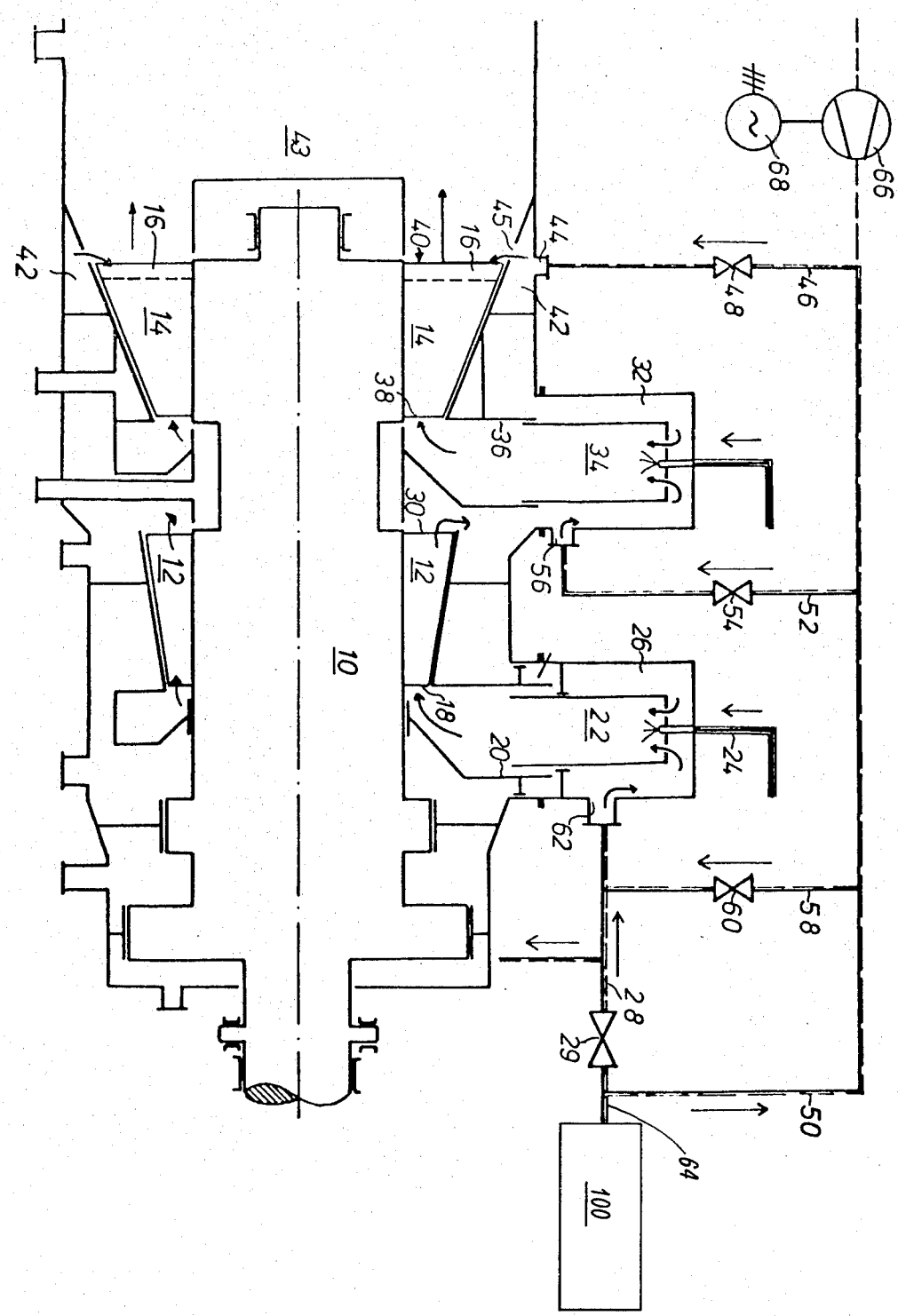

METHOD AND APPARATUS FOR DISSIPATING HEAT IN GAS TURBINES DURING SHUT-DOWN

BACKGROUND AND SUMMARY OF THE PRESENT INVENTION

The present invention relates generally to a method and apparatus for cooling a gas turbine and relates more particularly to a method and apparatus for cooling a turbine of an air-storage system, the turbine having at least one turbine stage which includes an axial flow-through of hot propellant gas.

An accumulation of heat will usually take place in gas turbines of an air-storage system after the turbine has been shut-off. This accumulation of heat is caused by the windage work performed during the deceleration of the machine as a result of contact of the machine blades with air. The accumulation of heat can result in an unduly sharp rise in the temperature of the turbine components.

Accordingly, an object of the present invention is to eliminate, or to at least maintain within a safe magnitude, any rise in temperature caused by the windage work.

According to the present invention, in a gas turbine having at least one turbine stage with axial flow-through, a gaseous medium of lower temperature, especially air, is conveyed to the turbine stage, or at least one turbine stage if several stages are involved, following a cut-off of the propellent gas flow. The blading of the turbine which operates as a ventilator during the deceleration of the turbine, compresses the gaseous medium being conveyed to the stage, with the gaseous medium continuing its flow to an exhaust gate of the turbine. Since the temperature of the gaseous medium being conveyed is preferably equal to the ambient temperature and is lower than the temperature of the propellant gas during the operation of the turbine, the gaseous medium will be able to absorb the windage heat without undergoing an undue rise in temperature. The turbine may even be cooled-off by a proper selection of the temperature level of the gaseous medium being conveyed. It will be necessary, however, to provide a volume of gaseous medium that is sufficient to dissipate the resultant amount of windage heat without resulting in an undue increase in temperature of the gaseous medium.

When viewed in the direction of flow, the blade rings of a turbine stage which are last have the greatest diameter, and, thus, perform a greater percentage of the windage work. Accordingly, it will be sufficient in many instances and also advantageous to convey the gaseous medium to one of the last blade rings of at least one turbine stage. Furthermore, if the turbine has several turbine stages it will be expedient to convey the medium at least to the last turbine stage.

The medium can be conveyed to the desired turbine stage or stages most advantageously if the corresponding combustion chamber is provided with an intake for the gaseous medium which can be shut off. In this manner, the gaseous medium is conveyed by way of the combustion chamber of the specific turbine stage, with the result that the gaseous medium initially provides a cooling for the combustion chamber and that the medium undergoes some pre-heating to thereby avoid a sudden and sharp cooling of the turbine blading.

In a more preferred form of the present invention, an annular duct surrounds the blade ring and is provided with apertures leading to the blade ring. The gaseous medium is supplied to the annular duct through an intake for the medium that can be shut off. This addition of the annular duct does not require a costly outlay to be made.

The medium can be conveyed to the intakes or connecting points by a compressor or by a ventilator. In a gas turbine which is used in connection with an air-storage system, however, it will be expedient to connect the intakes directly with the air-storage compartment.

BRIEF DESCRIPTION OF THE DRAWING

Additional advantages of the invention will become apparent from the description of a practical example which is given below and which is based on a single drawing in schematic form. The single drawing is a cross-sectional side view of a two-stage gas turbine for an air-storage system.

DETAILED DESCRIPTION OF A PREFERRED EMBODIMENT

With reference to the single drawing, a turbine shaft 10 includes a first turbine stage 12 and a second turbine stage 14. The turbine stages 12 and 14 contain blades which are fastened to the shaft 10 and associated vanes that are supported by the turbine housing. A final ring of blades 16, as viewed in direction of flow, is provided for the second turbine stage 14.

A propellant gas intake 18 of the first turbine stage 12 is connected with a first combustion chamber 22 by way of a first passage 20. The first combustion chamber 22 is supplied with fuel by way of a fuel pipe line 24 and with combustion air by way of a first jacket-like area 26 and a pipe line 28. The pipe line 28 is connected by way of a set of control and shut-off elements, for example by a single valve 29 with an air-storage compartment 100.

A propellant gas outlet 30 of the first turbine stage is connected by way of a second jacket-like area 32, a second combustion chamber 34, and a second passage 36 with a propellant gas intake 38 of the second turbine stage 14. The propellant gas outlet 40 of the second turbine stage 14 ends at an exhaust duct 43.

The final blade ring 16 of the second turbine stage 14 is surrounded by an annular duct 42 which contains a plurality of apertures 45 leading to the blade ring 16. The annular duct 42 includes a fitting 44 for the supply of the gaseous medium. The fitting 44 communicates with the outside through a main pipe line 50 by way of a pipe line 46 having a shut-off valve 48.

The main pipe line 50 is further connected by way of a pipe line 52 and a shut-off valve 54 with a fitting 56 which is arranged at the second jacket-like area 32 of the second combustion chamber. Another pipe line 58 leads in a similar manner by way of a shut-off element 60 to a fitting 62. The fitting 62 is arranged at the jacket-like area 26 of the first combustion chamber. The fitting 62 is also connected with a line 28 for the supply of combustion air.

When the gaseous medium consists of air, the main pipe line 50 is connected to a pipe line 64 which leads from a valve 29 to the air-storage compartment. However, if the turbine is not designed for connection to the air-storage compartment, the main pipe line 50 must be connected to an air ventilator or to an air compressor 66, which can be coupled, for example, to an electrically driven motor 68. Such an arrangement is illustrated in the drawing by broken lines.

When the turbine operation is ended, that is when the fuel supply is cut off, the supply of combustion air is blocked by the valve 29 and the rotor of the turbine is decelerating, the shut-off valves 48, 54 and 60 are opened to supply air from the air-storage compartment 5 by way of the pipe line 64 and the main pipe line 50 to the fittings 44, 56, 62 and into the turbine. The path taken by the air inside the turbine is indicated by arrows. That is, the air which is conveyed to the fitting 62 flows through the first jacket-like area 26 into the first combustion chamber 22 and through the first passage 20 to the first turbine stage 12. During its travel the air absorbs heat from the hot turbine components, and is thus pre-heated before entering the first turbine stage 12. When inside the first turbine stage 12 which acts as a ventilator during the deceleration of the rotor, the air will absorb the windage heat, being generated at this time, and become more heated. The air will then flow into the second jacket-like area 32 of the second combustion chamber.

Additional air is supplied and is admitted by way of the fitting 56. All of the air is now conveyed through the second combustion chamber 34, to the second turbine stage 14. Here again, as in the first turbine stage, the turbine components touched by the air flow are cooled. The air being fed into the second turbine stage is pre-heated air which again absorbs windage heat, and is then discharged into the exhaust duct 43.

The last blade ring 16 similarly receives air from the annular duct 42 by way of the aperture 45. This is particularly advantageous for high-powered turbines since the last blade rings of such turbines, and especially the rings of the last turbine stages, have a large diameter and will therefore generate substantial amounts of windage heat which will be properly dissipated by the additional air supply through apertures 45.

It is not necessary to convey air to all fittings 44, 56, 62 simultaneously as shown by the example illustrated and described. In many cases one need only to convey air to one of the fittings or to any combination of the fittings.

It is to be understood that the form of embodiment of the invention which has been described above has been given by way of a purely indicative and in no way limiting example. Other modifications may readily be made by one skilled in the art without thereby separating from the scope of the invention.

What is claimed is:

1. An apparatus for dissipating heat in a gas turbine engine resulting from a deceleration of turbine components, comprising:
   a gas turbine engine having at least one turbine stage and having combustor means for supplying hot propellant gas to said turbine stage during operation of the gas turbine engine;
   a source of coolant gas under pressure; and
   means for selectively supplying said coolant gas to said turbine stage at a temperature below a temperature of the hot propellant gas when the flow of said hot propellant gas is discontinued, said means for selectively supplying said coolant gas including; an annular duct surrounding a final blade ring of the at least one turbine stage, the annular duct having a plurality of apertures providing communication between the duct and the final blade ring, and valve means for selectively supplying the coolant gas to the annular duct after the flow of hot propellant gas is discontinued.

2. The apparatus of claim 1 wherein:
   the gas turbine engine includes a plurality of turbine stages each having combustor means for supplying hot propellant gas to each of the said turbine stages during operation of the gas turbine engine, said coolant gas being selectively supplied to all of the plurality of stages after the flow of the hot propellant gas is discontinued.

3. The apparatus of claim 1 wherein;
   the gas turbine engine includes a plurality of turbine stages;
   the combustor means supplies hot propellant gas to the turbine stages during operation of the gas turbine; and,
   the coolant gas is selectively supplied to the last stage of the gas turbine engine.

4. The apparatus of claim 1 further comprising:
   an air-storage compartment, the gas turbine engine supplying pressurized air to the air-storage compartment; and wherein
   the coolant gas is selectively supplied by the air-storage compartment.

5. The apparatus of claim 1 further comprising:
   a compressor and an electric motor, the compressor being driven by the electric motor to selectively supply the coolant gas.

6. A method of dissipating heat in a turbine engine resulting from a deceleration of turbine components, comprising the steps of:
   operating a gas turbine engine with a flow of hot propellant gas;
   stopping the flow of hot propellant gas through at least one stage of the gas turbine engine;
   flowing a coolant gas at a temperature below a temperature of the hot propellant gas through the at least one stage of the gas turbine engine after the flow of hot propellant gas through the at least one stage has been stopped, whereby the coolant gas absorbs heat from decelerating components of the at least one stage of the gas turbine engine, said flow of coolant gas being selectively supplied directly to a final blade ring of the at least one stage as viewed in a direction of axial flow of the hot propellant gas after the flow of the hot propellant gas is discontinued, the coolant gas being supplied to the final blade ring substantially uniformly throughout a circumference of the final blade ring by supplying the coolant gas through an annular duct.

7. The method of claim 6 further comprising the step of:
   flowing the coolant gas through additional stages of the gas turbine engine, whereby the coolant gas absorbs heat from decelerating components of the additional stages of the gas turbine engine.

8. The method of claim 6 wherein the coolant gas is flowed through the last stage of a plurality of stages of the gas turbine engine.

9. The method of claim 6 further comprising the steps of:
   supplying pressurized air to an air-storage compartment from the gas turbine engine; and,
   supplying the coolant gas from the air-storage compartment.

10. The method of claim 6 further comprising the step of supplying the coolant gas from an electric motor driven compressor.

11. An apparatus for dissipating heat in a gas turbine engine resulting from a deceleration of turbine components, comprising:

- a gas turbine having a plurality of serially arranged stages;
- first combustion chamber means for supplying hot propellant gas to a first of the plurality of turbine stages;
- the first combustion chamber means being surrounded by first jacket-like means for supplying fluid to the first combustion chamber means;
- means for supplying combustion air to the first combustion chamber means of the first turbine stage through the first jacket-like means;
- second combustion chamber means for supplying hot propellant gas to a second of the plurality of turbine stages;
- the second combustion chamber means being surrounded by second jacket-like means for supplying fluid to the second combustion chamber means;
- said second jacket-like means being connected with a propellant gas outlet of the first turbine stage;
- an annular duct surrounding a final blade ring of a last of the plurality of turbine stages, the annular duct having a plurality of apertures providing communication between the duct and the final blade ring;
- a source of coolant gas under pressure, said coolant gas being at a temperature below a temperature of the hot propellant gas;
- first valve means for selectively supplying said coolant gas both to the first and the second jacket-like means surrounding the first and the second combustion chamber means when the flow of hot propellant gas is discontinued; and
- second valve means for selectively supplying said coolant gas to the annular duct when the flow of the hot propellant gas is discontinued.

* * * * *